United States Patent [19]

Macemon

[11] 4,037,960

[45] July 26, 1977

[54] DIGITALLY SETTABLE SELECTIVE CONTROL FOR SPEED OF WAVELENGTH SCAN OR FOR TIME BASE SCAN

[75] Inventor: James H. Macemon, Glen Burnie, Md.

[73] Assignee: Baxter Travenol Laboratories, Inc., Deerfield, Ill.

[21] Appl. No.: 683,188

[22] Filed: May 4, 1976

[51] Int. Cl.² .......................... G01N 21/00; G01J 3/42
[52] U.S. Cl. .................................. 356/73; 346/33 A; 356/85; 356/96; 356/100
[58] Field of Search .................. 356/83.73, 85, 96, 97, 356/98, 100; 346/33 A

[56] References Cited

U.S. PATENT DOCUMENTS

| | | | |
|---|---|---|---|
| 2,971,429 | 2/1961 | Howerton | 356/83 |
| 3,563,656 | 2/1971 | Helms | 356/96 |

Primary Examiner—Vincent P. McGraw
Attorney, Agent, or Firm—Henry W. Collins; Richard G. Kinney

[57] ABSTRACT

In a recording spectrophotometer the ordinate of the plotter-scriber is controlled by the output of a photomultiplier while the abscissa of the plotter-scriber is controlled by a selectable mode manually adjusted controller.

In one mode, the controller furnishes a time base signal of selected rate of change, so that the abscissa of the plotter-scriber varies with the passage of time in accordance with said rate of change.

In another mode, the controller furnishes a stepping signal of selected periodicity, for application to a stepping motor, which changes the wavelength adjustment of the spectrophotometer at a rate determined by the selected periodicity. The spectrophotometer furnishes to the plotter-scriber an analog voltge varying with the instantaneous wavelength setting of the spectrophotometer, so that the abscissa of the plotter-scriber correspondingly varies with the instantaneous value of the wavelength.

A common manually adjusted digital setting means is used for adjusting either the said selected rate of change of the time base or the said selected periodicity of the stepping signal.

7 Claims, 3 Drawing Figures

DIGITALLY SETTABLE SELECTIVE CONTROL FOR SPEED OF WAVELENGTH SCAN OR FOR TIME BASE SCAN

CROSS REFERENCE TO RELATED APPLICATIONS

The scan control system disclosed herein is of general utility. It is part of a newly developed spectrofluorometer having other inventive features which are unrelated to the instant invention, except for use in the same commercial embodiment.

SUMMARY

A recording spectrofluorometer is capable of being operated in a plurality of modes.

One mode is that in which an optical property, such as transmission, scatter, or fluorescence, is measured under conditions which are otherwise constant, but in which the property of the sample changes with time, as, for example, because of a progressive chemical or biological change of the sample being investigated. In this instance, it is desired to obtain readings in the form of a graph, with the optical characteristic, as measured by a photoelectric instrument, controlling the ordinate of the plotter-scriber while the abscissa thereof increases with time. If the measurement is to be made over a time span of a few seconds, it is desirable to change the abscissa coordinate of the plotter-scriber rapidly, but if the measurement is to be made over a long period of time, the abscissa coordinate of the plotter-scriber should change only slowly. Accordingly, means must be provided so that the operator can adjust the speed of change of the abscissa coordinate of the plotter-scriber to a suitable value in order to perform an instrumental run in this mode.

Another mode is that in which such an optical property is measured, for a sample which is relatively unchanging, at a plurality of different wavelengths. It is desired, in this instance, to obtain readings in the form of a graph, with the optical characteristic again controlling the ordinate of the plotter-scriber while the abscissa thereof varies with the instantaneous wavelength. If the measurements are to be made over a wide frequency span and presented in one graph, it is desirable to rapidly vary the wavelength at which the measurements are made, but, if a detailed presentation of only a small frequency range is to be shown in the graph, then it is desirable to vary the wavelength at which the measurements are made only slowly. Accordingly, means must be provided so that the operator can adjust the speed of change of wavelength to a suitable value in order to perform an instrumental run in this mode.

Thus, it is necessary to have a time rate control for the time scan mode and a wavelength rate control for the wavelength scan mode.

In accordance with the invention these two controls are combined, thereby saving duplication of nearly identical parts and saving panel space on a crowded panel board.

A mode selector knob is provided, which alters the internal circuitry of the instrument for the different modes. Such a mode selector knob is necessary in any case if the instrument is to be capable of operating in different modes. The mode selector knob also controls the output of a single dual use digitally indicating scan rate setter which controls the speed of either time rate scan or wavelength scan, as commanded by the setting of the mode selector knob.

VIEWS OF DRAWING

DETAILED DESCRIPTION

Figure 1:
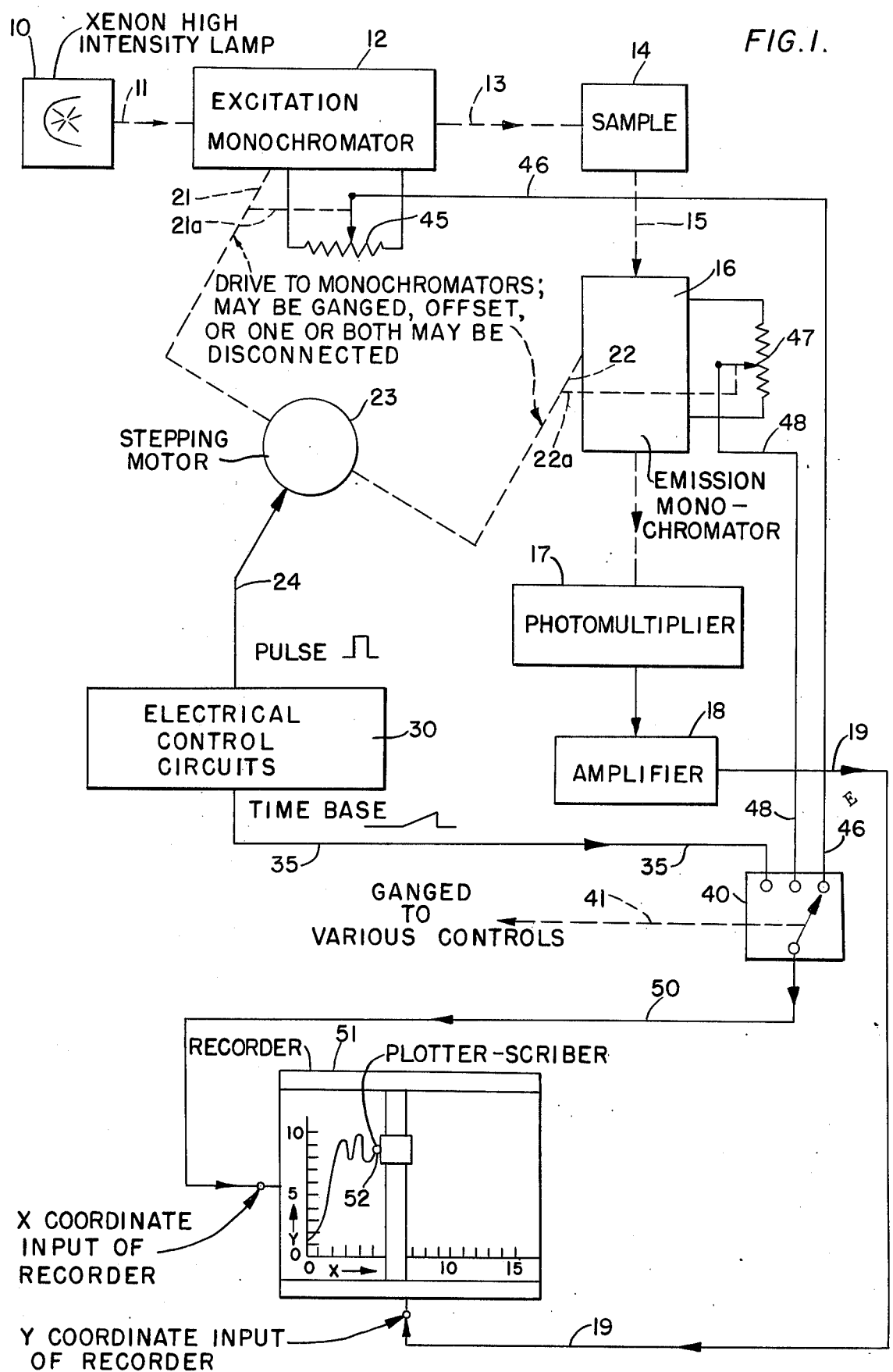
FIG. 1 is a diagram which shows the invention as utilized in one embodiment of spectrofluorometer.

The spectrofluorometer of FIG. 1 comprises a high intensity light source, such as a Xenon lamp, which produces a beam of radiation 11, which passes through an excitation monochromator 12. In the monochromator all wavelengths of light and ultraviolet energy are stopped, except for energy of a particular narrow band of frequencies, as determined by the wavelength scan drive 21. The wavelengths which are passed fall in a beam 13 onto a sample 14.

The sample may be under test for any of many optical properties, such as transmission, scattering or fluorescence. To measure any of these properties, wave energy sensing means pick up the wave energy emitted along the axis of beam 13 or along some other axis.

In FIG. 1, for illustration, the wave energy which is being sensed is depicted as an emergent emission beam 15, which is at an angle to the incident excitation beam 13. This arrangement is one which is useful for fluorescence measurements. For transmission measurements the beams 13 and 15 would be colinear, while for scattering measurements the angle between the excitation beam 13 and emission beam 15 might be anywhere from slightly less than 180° (for forward scatter measurements) down to near zero (for back scatter measurements).

The emission beam 15 passes through emission monochromator, wherein it is filtered to pass only those wavelengths selected by wavelength scan drive 22, to fall on photomultiplier 17. The current from photomultiplier 17, when amplified in amplifier 18 appears on conductor 19 as an electrical representation of the measured optical property.

The current in conductor 19 could simply be measured by a meter, but in FIG. 1 is shown as being used to control the drawing of a graph by a recorder 51 having a plotter-scriber 52, in which the value of the current on conductor 19 controls the instantaneous Y coordinate of the plotter-scriber.

As is well known by those skilled in the art, in such a plotter-scriber the current on conductor 10 does not actually supply the power used to draw the graph. The plotter-scriber is self-powered, and includes follow-up motor control means which compare the instantaneous position of the scriber with the current on conductor 19 to produce an error signal, which in turn controls th switching in and out of an electric motor drive which reduces the error to zero.

At the same time the Y coordinate of the plotter-scriber is being controlled, as just described, the X coordinate is also being controlled in accordance with a mode of operation, as selected by mode of operation selector 40.

In the particular embodiment of FIG. 1, the circuit permits the selection of three modes. It is to be understood that this is illustrative and not limiting on the invention.

In the illustrated mode, with mode selector switch on the right-most contact, the X coordinate of the plotter-scriber is controlled to follow the wavelength to which the excitation monochromator 12 is adjusted. The excitation monochromator 45 has a moveable tap, which is ganged by drive 21a with wavelength scan drive 21.

Thus, when the electrical control circuits 30 actuate wavelength scan stepping motor 23 to vary the wavelength setting of emission monochromator 12 via wavelength scan drive 21, the tap of excitation transmitter 45 in at the same time correspondingly varied by drive 21a, to transmit a current over excitation monochromator signal conductor 46 and X coordinate signal conductor 50 to the X coordinate controller of th plotter-scriber, so that the instantaneous X coordinate of the plotter-scriber corresponds with the wavelength setting of excitation monochromator 12.

If the mode selector switch 40 is in its central position, the X coordinate of the scriber-plotter is similarly controlled over X coordinate conductor signal line 50 to coorespond with wavelength setting of the emission monochromator 16, over an obvious circuit including emission transmitter 47, ganged by drive 22a to the wavelength setting, and emission monochromator signal conductor 48.

The reason for having one mode in which the X coordinate is controlled by the excitation monochromator 12 and having another mode in which the same coordinate is controlled by the emission monochromator 16 is that, in some experiments one or the other monochromators may stay adjusted to a constant wavelength, while the other monochromator setting varies. Further, in some experiments, it is necessary to gang the two monochromators to operate in a tracked scan or in an offset scan relationship.

The system can also be operated in a mode wherein neither of the two monochromators 12 or 16 is scanned, but in which each one stays set to a fixed wavelength. Under these circumstances, the only change is the passage of time and the change of the optical characteristics of the sample. In this mode, the X coordinate of the plotter-scriber must vary uniformly with time. This is achieved by adjusting mode of operation selector 40 to connect the X coordinate signal line to conductor 35, which transmits a time base, generated by the electrical control circuit 30, to the X coordinate controller of the recorder or plotter-scriber.

Ganged to the mode selector are other controls, as indicated by dotted lines 41, such as are necessary to control the apparatus in different modes of operation. For example, the wavelength scan drive 21 or 22 might be connected or disconnected in various modes, as explained above.

The details of electrical control circuit 30 will now be described.

This circuit has two outputs, a pulse output appearing on pulse control circuit 24 for the wavelength scan stepping motor 23 and a time base scan appearing on conductor 35. The pulse output and the time base output are not used at the same time, since there is no mode of operation which requires the presence of both at the same time.

Figure 2:
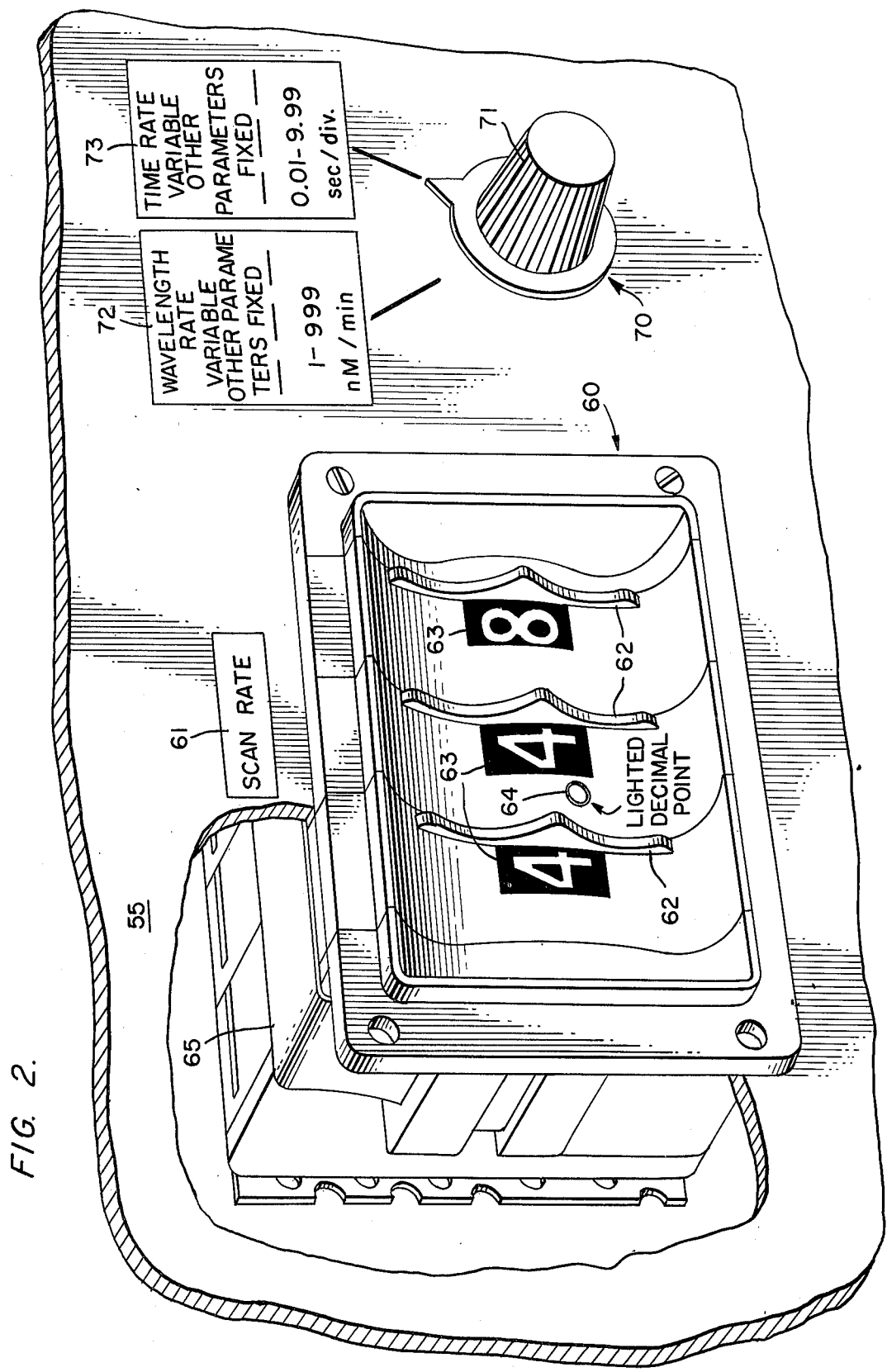
FIG. 2 is a representation of a typical front panel arrangement used with the invention, with the panel partly broken away.

The manually actuable selecting means which control the circuitry of the electrical control circuits are shown in FIG. 2, which shows a section of the front panel 55 of an embodiment that has two modes of operation. The manual mode selector 70 (which is analagous to the mode of operation selector 50 of FIG. 1) comprises a knob 71 which has a pointer which can be actuated to a selected one of two positions, indicated by indicia 72 and 73. Indicia 72 on the left, indicates that the wavelength is varied over the range of 1 to 999 nanometers per minute, while indicia 73, on the right, indicates that the time rate is variable over the range 0.01 to 9.99 seconds per division (division refers to the spacing of grid coordinates along the X coordinate of the plot of the recorder or plotter-scriber). The numberical value of these scan rates is chosen by the operator, who actuates thumb wheels 62 of digital potentiometer 60 to change the numerical indicia 63 to the desired numerical value. The indicia 61 indicates that the digital potentiometer 60 controls the scan rate. A lighted decimal point 64 goes on and off automatically, in accordance with the setting of the manual mode selector 70. The use of the automatically lighted decimal point 64 permits the same digital numerical indicia 63 to indicate on either of two ranges, from 1 to 999 and from 0.01 to 9.99.

Figure 3:
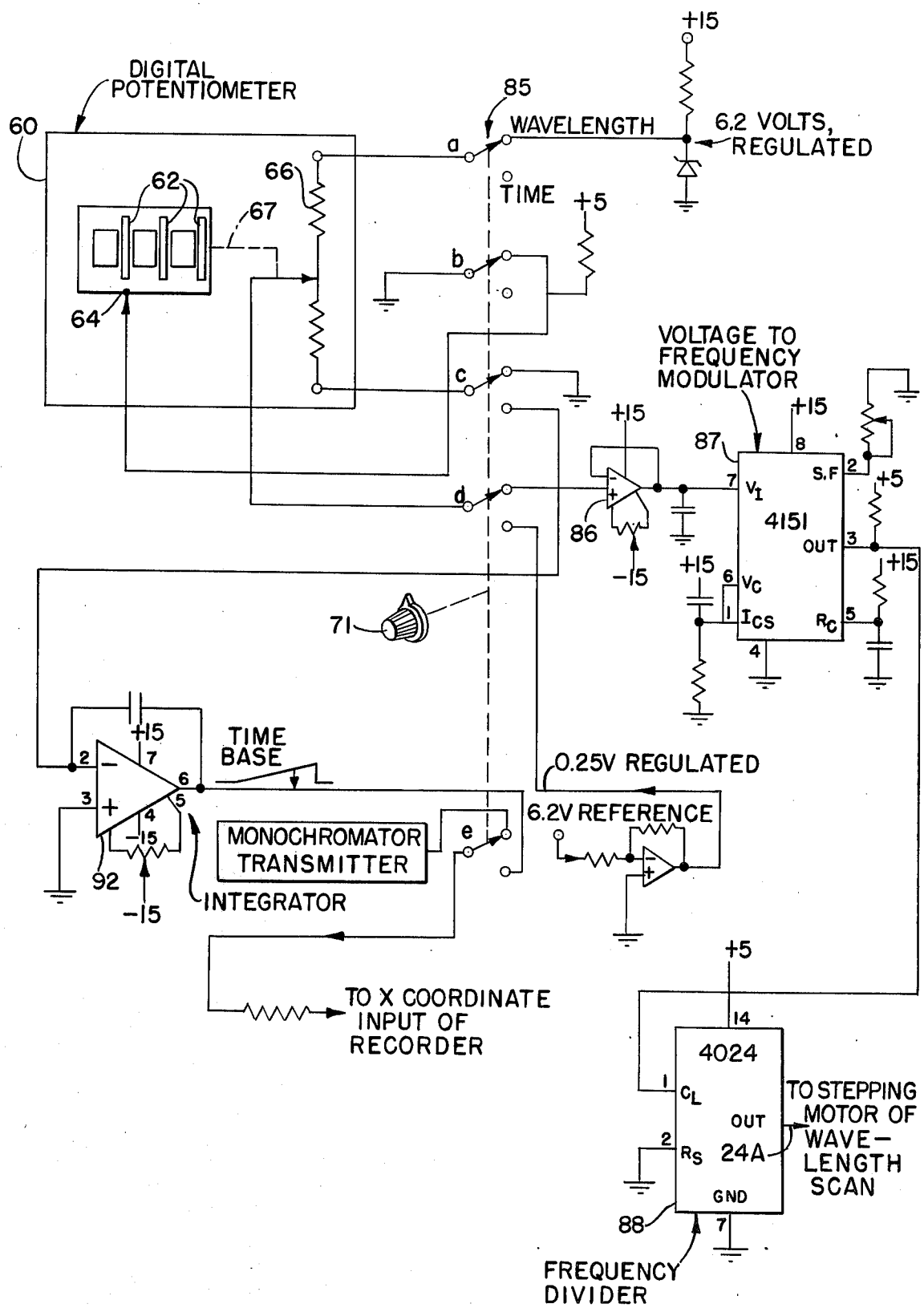
FIG. 3 is a schematic of the wiring diagram of another embodiment of the invention.

The thumb wheels 62 control, in a manner known to those skilled in the art, a series of switches and resistors located in the rear housing 65 of digital potentiometer to effect the resistance variation of a continuous potentiometer having a minimum change equal to one thousandth of the total range. This is shown in FIG. 3 where the potentiometer resistor 66 of digital potentiometer 60 is shown being varied by a mechanical drive 67 under the control thumb wheels 62.

A mode selector switch 85 having double throw contacts $a$ to $e$, is put into either one of two positions, "Wavelength" or "Time" by knob 71.

In the wavelength scan mode, the upper $a$ contact of mode selector switch 85 supplies regulated 6.2 volts over an obvious circuit to the upper end of potentiometer resistor 66, while the lower end of that resistor is grounded at the upper $c$ contact. Accordingly, the tap on potentiometer resistor 66, in accord with the selected setting of digital potentiometer 60, supplies a selected voltage to voltage follower 86 by way of the upper $d$ contact. Voltage follower 86 controls frequency modulator 87 and frequency divider 88 to produce a periodic pulsing voltage on output line 24A, which output line is connected to a stepping motor, such as stepping motor 23 of FIG. 1. Thus, the speed of the stepping motor is controlled by the setting of digital potentiometer 60. The instantaneous wavelength setting of the monochromator is transmitted to the X coordinate input of the recorder by way of the upper $e$ contact.

In the time scan mode, the upper end of potentiometer resistor 66 is open circuited at the lower $a$ contact of mode selector switch 85 while the tap is connected to 0.25 volts regulated at the lower $d$ contact. The lower end of potentiometer resistor 66 is connection by the lower $c$ contact to the input of integrator 92. Thus, the digital potentiometer 60 acts merely as a controlled step resistor to charge the integrator 92 at a rate determined by the selected setting of the digital potentiometer 60. The intergrator produces a time base signal which is supplied by the lower $e$ contact to output line 50A, which controls the X corrdinate the plotter-scriber.

Although the digital potentiometer 60 described here is a commercial item which has a step variation in resistance, it is to be understood that the resistance variation could be uniform. However, the indicia provided to indicate the setting should have an accuracy comparable to that of the illustrated digital potentiometer. The setting of a unit which uses a simple pointer and 180° scale is generally not sufficiently accurate for use with a curve drawing recorder.

I claim:

1. In a spectrophotometer adapted to operate over a band of wavelengths:
   a recorder having a plotter-scriber for drawing a graph in two coordinates;
   means responsive to an optical meausrement made by said spectrophotometer for controlling the position of the plotter-scriber along one coordinate;
   said recorder having means for controlling the position of the plotter-scriber along another coordinate in accordance with the value of a signal;
   mode selector means for controlling the spectrophotometer to operate in a selected one of different modes;
   a common digitally settable means for selecting a desired scan rate;
   means, under the control of said mode selector means in a first of said different modes, for generating a time base having a rate of rise determined by said common digitally settable means and for supplying said time base to said recorder as said signal;
   means, under the control of said mode selector means in a seocnd or said different modes, for scanning the wavelengths to which said spectrophotometer is set at a rate determined by said common digitally settable means, and for producing a voltage, indicative of the wavelength to which the spectrophotometer is set, and for supplying said voltage to said recorder as said signal.

2. Subject matter under claim 1 in which
   said common digitally settable means includes means optionally indicating a decimal point;
   means under the control of said mode selector means for controlling the indication of said decimal point.

3. Subject matter under claim 1 in which
   said spectrophotometer has a scanable excitation monochromator and a scanable emission monochromator;
   said mode selector means has one mode in which the said wavelength which is scanned is the wavelength of the excitation monochromator; and
   said mode selector means has another mode in which the said wavelength which is scanned is the wavelength of the emission monochromator.

4. Subject matter under claim 1 in which
   said spectrophotometer has a scanable excitation monochromator and a scanable emission monochromator; and
   said mode selector means has a mode in which the said wavelength which is scanned is the wavelength of both the excitation and the emission monochromators.

5. Subject matter under claim 1 in which
   said common digitally settable means includes a thumb wheel, individual to each decade of the digitally settable means, for setting said digitally settable means.

6. Subject matter under claim 1 in which
   the means for scanning the wavelength to which said spectrophotometer is set includes a stepping motor and means to supply stepping pulses to said stepping motor;
   said means to supply stepping pulses includes means, under the control of said common digitally settable means, for controlling the periodicity of said pulses to correspond to the value set in the digitally settable means.

7. Subject matter under claim 1 in which
   said spectrophotometer is a spectrofluorometer.

* * * * *

UNITED STATES PATENT AND TRADEMARK OFFICE
CERTIFICATE OF CORRECTION

PATENT NO. : 4,037,960
DATED : July 26, 1977
INVENTOR(S) : James H. Macemon

It is certified that error appears in the above-identified patent and that said Letters Patent are hereby corrected as shown below:

Column 5, line 11, delete "meausrement" and insert therefor --measurement--.

Column 5, line 29, delete "seocnd" and insert therefor -- second --.

line 29, delete "or" and insert therefor -- of --.

Signed and Sealed this

Seventh Day of February 1978

[SEAL]

Attest:

RUTH C. MASON
Attesting Officer

LUTRELLE F. PARKER
Acting Commissioner of Patents and Trademarks